Patented Apr. 17, 1923.

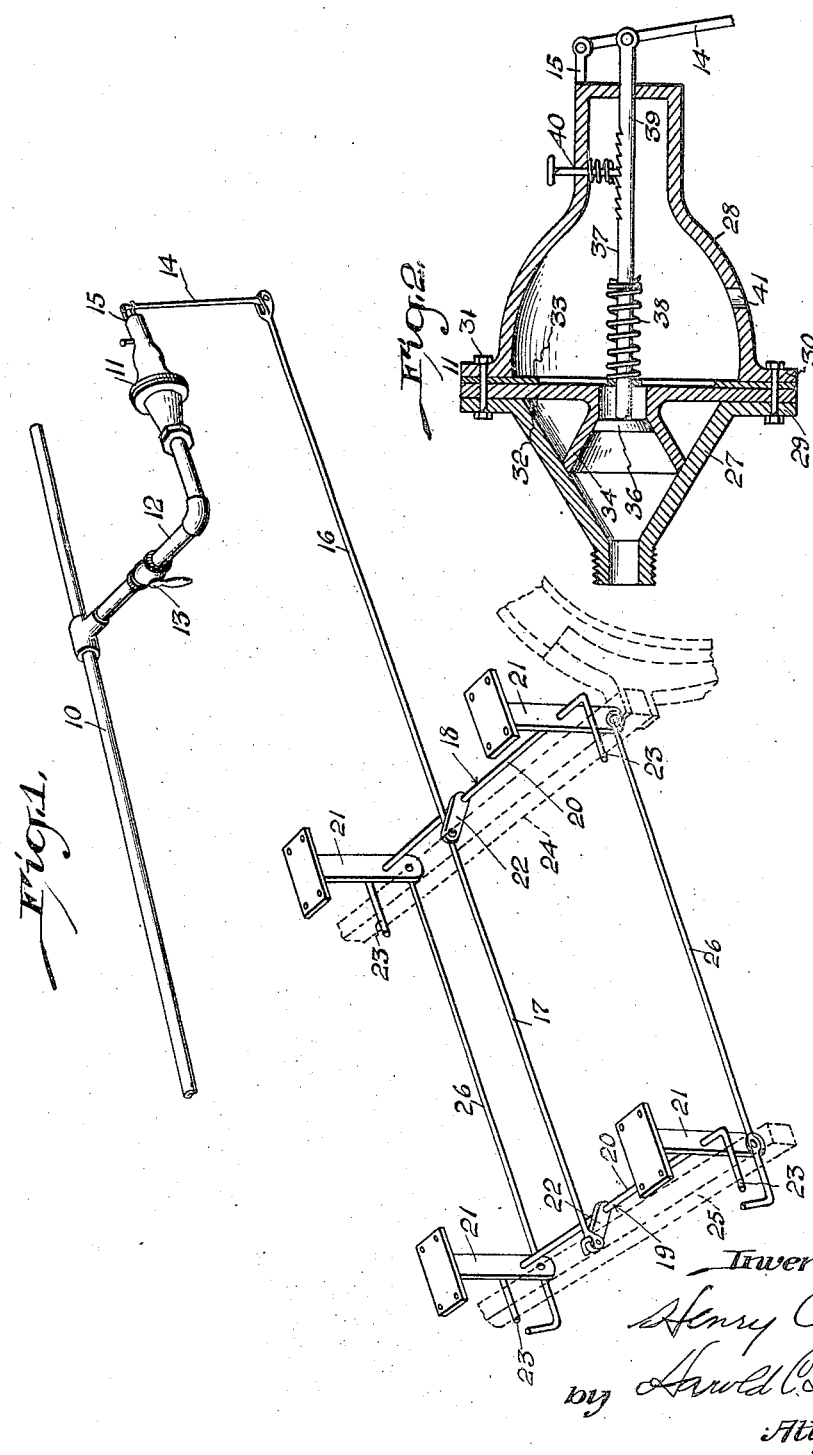

1,452,055

UNITED STATES PATENT OFFICE.

HENRY C. STOKES, OF SUMTER, SOUTH CAROLINA.

VALVE FOR AIR-BRAKE SAFETY APPLIANCES.

Original application filed September 29, 1920, Serial No. 413,508. Divided and this application filed May 20, 1921. Serial No. 471,032.

*To all whom it may concern:*

Be it known that I, HENRY C. STOKES, a citizen of the United States, residing at Sumter, in the county of Sumter and State of South Carolina, have invented certain new and useful Improvements in Valves for Air-Brake Safety Appliances, of which the following is a specification.

This application is a division of my pending application for air brake safety appliances, Serial No. 413,508 filed Sept. 29, 1920, and patented July 19, 1921, Patent Number 1,385,160.

The invention relates to air brake safety appliances, and more particularly to the valve structures in the means for applying the air brakes throughout the train in case any of the brakes or brake beams on any of the trucks should become displaced.

Further features and details of the invention will appear as described in connection with the accompanying drawings and hereinafter set forth and claimed.

Referring to the drawings forming a part of this specification, like numerals of reference designate corresponding parts in the figures, in which, Figure 1 is a diagrammatic perspective view illustrating an application of my invention, and Figure 2 is a longitudinal sectional view of a valve structure particularly adapted for use in connection with the system illustrated in Figure 1.

In Figure 1 of the drawings, the reference numeral 10 indicates a section of the usual train pipe employed in air brake systems, and 11 represents a valve which is connected with the train pipe by pipe 12 which may have a cut off cock 13.

A lever 14, pivoted to a projection 15 on valve 11, is connected with a link 16, which in turn is connected with link 17, and bellcrank levers 18 and 19.

The bell-crank levers, 18 and 19, each comprise pivot rods 20, carried by hangers 21, which are adapted to be supported on the car sills or in any desired manner. Lever arms 22, are mounted on the middle of these rods 20, for connecting them with the links 16 and 17, and on the outer ends of these rods are lever arms 23, normally horizontal and extending under the brake beams 24 and 25.

The hangers 21 also carry rods 26, which provide a frame structure for supporting the brakes and brake beams if they should fall.

The valve 11, heretofore referred to, is preferably made with a two part casing comprising castings 27 and 28. These castings have flanges 29 and 30, respectively, which are fastened together by bolts 31 retaining the partition members 32 and 33 between them. The member 32 is apertured and provided with a conical or funnel-shaped member 34 preferably formed integral therewith, providing a seat for the valve 36 mounted on one end of the valve rod 37, which is connected with the lever 14, at its other end. The partition or cross member 33 provides a bearing through which rod 37 can reciprocate, and the end of the casting 28 is apertured providing another bearing for rod 37. A valve spring 38 positioned on rod 27 rests against the bearing portion of member 33 for normally holding the valve member 36 seated in the conical member 34. Valve rod 37 is provided with ratchet teeth 39 which are engaged by a spring pressed pawl 40 for holding the valve 36 open after lever 14 has been actuated. An aperture 41 affords a vent for the valve and is of such a size as will permit the air in the train pipe to escape slowly for effecting a gradual application of the brakes.

It will be apparent that if any of the brakes should drop the lever arms 23 would be tilted down and drag on the link 16 and lever 14 to operate the valve 11 for letting air out of the train pipe for applying the brakes, and the frame structure will support the members from falling to the ground. In case the link 16 or 17, or any of the operating mechanism should be broken during the operation, the spring pressed pawl 40, cooperating with ratchet 39, prevents the valve rod 37 from being retracted until the pawl member has been manually withdrawn by operation of the handle on top of the pawl. The cut off cock 13 can be used to prevent the escape of air in case valve 11 should become defective or inoperative.

Having shown and described one embodiment of my invention I do not desire to have it confined closely to the specific structure shown, it being understood that changes may be made in form, proportion, and organization of its various parts without departing from the spirit of the invention as indicated by the scope of the appended claims.

I claim:

1. A valve adapted to be connected with the train pipe of an air brake system comprising a two part casing, a valve seat mounted between the parts of the casing, a valve for cooperating with said seat, a spring pressed reciprocating actuating rod for supporting the valve in its seat and extending through the outer casing member, a ratchet along said rod, a spring pressed pawl cooperating with said ratchet for holding said valve open when said rod has been actuated, and a handle on said pawl for releasing it and allowing the valve to close.

2. A valve adapted to be connected with the train pipe of an air brake system comprising a two part casing member, one of the casing parts provided with an inlet port in its end and the second casing part having an outlet port, a partition member adapted to be positioned between said casing parts and provided with a valve seat, means for fastening the casing parts and partition member together, a valve member cooperating with said valve seat, a valve operating rod connected with said valve member and extending through the casing member, a spring on said rod for normally holding the valve member closed, and means for retaining the valve open upon the actuation of said rod.

3. A valve adapted to be connected with the train pipe of an air brake system comprising a casing member having a chamber closed at one end and provided with inlet and outlet ports, a partition in the casing member separating said ports and carrying a valve seat, a valve member for cooperating with said seat, a valve operating rod connected with the valve member and passing through said closed end of the chamber, a spring on said rod for normally holding the valve member closed, and means for retaining the valve open upon the actuation of said rod.

4. A valve comprising a casing member having inlet and outlet ports, a partition in the casing member separating said ports having a port therethrough and provided with a funnel shaped member extending from the partition to the wall of the casing, a valve member cooperating with said funnel shaped member as a valve seat for it, and a valve operating rod connected with said valve member for reciprocating it toward and from said valve seat.

5. A valve comprising a casing member having inlet and outlet ports, a partition in said casing member separating said ports and having a port therethrough and provided with a valve seat, a valve member cooperating with said seat, a valve operating rod connected with the valve member and extending therefrom through the port in said partition and through the casing, and a second partition member on the other side of said partition from the valve member provided with a port corresponding with the port in the first partition member and having a member extending across said port having an aperture through which said operating rod passes as a guide.

6. A valve comprising a two part casing member, one of the casing parts provided with an inlet port in its end and the second casing part having an outlet port, a partition member positioned between said casing parts and provided with a funnel shaped projection from one side thereof extending to the wall of the casing part having the inlet port and surrounding a port through the partition, a valve member cooperating with said funnel shaped member as a valve seat and having a reciprocatory rod extending from it through the port in the partition member and through the second casing part for operating the valve member to and from its seat, and a second partition member between the aforesaid partition member and the second casing part having a member extending across the port in the first partition and provided with an aperture through which said reciprocatory rod passes as a guide.

7. A valve comprising a two part casing member, one of the casing parts provided with an inlet port in its end and the second casing part having an outlet port, a partition member adapted to be positioned between said casing parts and having an aperture therethrough with a valve seat facing the inlet port in the first mentioned casing port, a valve member for cooperating with said seat, a valve operating rod connected with said valve member and extending through the port in the partition and through the second casing member, a cross member on the opposite side of said partition from said valve and valve seat and having an aperture through which said valve rod passes, a stop member on said valve rod within the second casing part, and a spring positioned on said rod between said stop and said cross member for normally maintaining the valve closed.

8. A valve adapted to be connected with the train pipe of an air brake system comprising a casing member having an inlet port adapted to be connected with the air line of a brake system and a relatively small outlet port for allowing a gradual escape of air therethrough from the casing, a partition member in said casing between said ports separating the casing into two chambers, comprising a relatively small inlet chamber communicating with the inlet port for accommodating a valve member and a large expansion chamber communicating with the small outlet port, said partition having a port affording communication between the two chambers and a valve seat surrounding said port, a valve member cooperating with said valve seat for shutting off the communication between the chambers, and a valve rod connected with said valve member for operating it toward and away from said valve seat.

In testimony whereof I affix my signature.

HENRY C. STOKES.